United States Patent
Freeman

(10) Patent No.: US 6,260,666 B1
(45) Date of Patent: Jul. 17, 2001

(54) WHEEL CHOCK DEVICE

(75) Inventor: Michael Allan Freeman, Frinton-on-Sea (GB)

(73) Assignee: Turpins plc, Essex (GB)

( * ) Notice: Subject to any disclaimer, the term of this patent is extended or adjusted under 35 U.S.C. 154(b) by 0 days.

(21) Appl. No.: 09/376,598

(22) Filed: Aug. 18, 1999

(30) Foreign Application Priority Data

Nov. 3, 1998 (GB) .................................................. 9823938

(51) Int. Cl.[7] .............................. B60T 3/00; B60B 39/00; B60R 25/00; B60S 9/00
(52) U.S. Cl. ............................................. 188/32; 188/2 R
(58) Field of Search ............................. 188/32, 4 R, 2 R, 188/62; 410/30, 58; D12/217; 52/155

(56) References Cited

U.S. PATENT DOCUMENTS

| | | | | |
|---|---|---|---|---|
| 1,082,807 | * | 12/1913 | Holworthy | 188/32 |
| 1,768,265 | * | 6/1930 | Nicholls | 188/32 |
| 2,316,178 | * | 4/1943 | Morgensen, Jr. | 188/32 |
| 2,585,370 | * | 2/1952 | Cless | 188/32 |
| 2,816,627 | * | 12/1957 | Wilson et al. | 188/32 |
| 2,903,096 | * | 9/1959 | Andersen | 188/32 |
| 3,068,962 | * | 12/1962 | Petro | 188/32 |
| 3,353,633 | * | 11/1967 | Leonard et al. | 188/32 |
| 3,387,686 | * | 6/1968 | Little | 188/32 |
| 3,655,014 | * | 4/1972 | Nyborg | 188/32 |
| 4,109,763 | * | 8/1978 | Sugiho | 188/32 |
| 4,140,206 | | 2/1979 | Yamazaki et al. . | |
| 4,421,210 | * | 12/1983 | Sugiho | 188/32 |
| 5,444,949 | | 8/1995 | Ciaccio . | |
| 5,465,814 | * | 11/1995 | Ziaylek | 188/32 |

FOREIGN PATENT DOCUMENTS

| | | | |
|---|---|---|---|
| 457706 | * | 3/1928 | (DE) . |
| 3027260 | * | 2/1982 | (DE) . |
| 744327 | * | 11/1996 | (EP) . |
| 0 863 061 A1 | | 9/1998 | (EP) . |
| 286 002 | | 2/1928 | (GB) . |
| 2 178 121A | | 2/1987 | (GB) . |
| 2316710 | * | 4/1998 | (GB) . |
| 2332930 | * | 7/1999 | (GB) . |
| 6239185 | * | 8/1994 | (JP) . |

* cited by examiner

Primary Examiner—Douglas C. Butler
(74) Attorney, Agent, or Firm—Howell & Haferkamp, L.C.

(57) ABSTRACT

A wheel chock device is constructed of three or more mutually hinged sections and can be folded into a compact form for storage. The device can be erected into a triangular chock configuration, or can be stretched out in one plane to act as a sand ladder, or can be folded to act as a jack support. Each section is made up of spaced bars.

7 Claims, 4 Drawing Sheets

WHEEL CHOCK DEVICE

BACKGROUND OF THE INVENTION (a) Field of Invention

This invention relates to a wheel chock for chocking the wheels of a vehicle.

(b) Background of Invention

Vehicle wheels have to be chocked in a number of different situations. For example, when one side of a car is jacked up to change a wheel, it is always recommended that one or both wheels on the opposite side be chocked to ensure that the vehicle does not roll forward or backwards whilst part of it is being supported other than on its wheels. Wheel chocking becomes even more important with the use of off-road vehicles, where it is often necessary to raise part of a vehicle off the ground in order to extricate the wheels from a place where they have no grip or to raise the vehicle sufficiently for it to pass over an obstacle or for an obstacle to passed underneath the vehicle.

Whilst a piece of brick or the like is generally adequate to chock the wheels of a car on a road or other level surface, an off-road vehicle travelling over rough terrain needs a much more substantial chock.

DESCRIPTION OF THE PRIOR ART

It has been common practice for off-road vehicles to carry around with them one or more chocks, against a situation when they will be needed such chocks are rigid triangular shaped bodies which are heavy and take up a lot of space. As a result, they are not always carried when they should be carried and this can lead to difficulties.

SUMMARY OF THE INVENTION

According to the invention, there is provided a wheel chock device for chocking the wheels of a vehicle, the device comprising at least three sections hinged to one another about spaced-apart parallel axes, each section being formed from a set of spaced bars, the sections being adapted to be turned about the parallel hinged axes to form a triangular body and means for securing the sections in the form of a triangular body.

The use of three hinged sections allows the device to be turned about the parallel hinged axes so as to take up a compact, folded configuration in which it can be readily stored without taking up excess space.

The use of three hinged sections also allows the device to have a secondary function, as a so-called 'sand ladder'. If the sections are laid out So that they lie end to end, an elongate Surface is formed which can be laid over unstable ground, so that a vehicle wheel can ride over that unstable ground, on the surface of the device.

The spaced bars which form the chock device may be square section bars made of hollow bar stock, with the ends of each bar section being closed. One face of each bar section can be provided with surface irregularities, such as ribs, to provide grip when a vehicle wheel is in contact with that surface.

Alternatively the bars may be made from channel section stock, so that the bars have one open face. The surface irregularities can be formed by plunged holes in the outward facing face of the channel section. The holes may have raised rims.

The beams preferably are arranged parallel to one another and the beams in each section are spaced apart so that when the device is folded, beams of adjacent sections can lie between one another to reduce the overall size of the folded device.

The beams may be made from aluminum or steel (preferably stainless steel) channel or square section stock.

It is possible to have more than three sections, when a longer sand ladder is required. Normally however when the device is erected into its chocking configuration, only three sections are likely to take part, namely one section lying on the ground, one section forming the abutment surface for the vehicle wheel and one section bracing the abutment surface against the ground engaging surface.

The hinging between the sections is preferably accomplished by a round bar or tube which is fitted through aligned drilled holes through the ends of the adjoining and overlapping sections.

The device can have a third function, as a jacking base. When folded, the device preferably has two opposite substantially parallel faces. One face preferably has a lip or lips around a support area which will accommodate the foot of a jack. The device can be placed on the ground at the place where the jack is to be used, the jack foot is placed in the support area, and the jack is operated to raise a load. Placing the jack foot on the device spreads the ground loading arising from jack operation over an area substantially larger than that of the jack foot. When folded, the device preferably has one of its parallel faces substantially larger than the opposite face, and the smaller of the two faces carries the support area.

BRIEF DESCRIPTION OF THE DRAWINGS

The invention will now be further described by way of example, with reference to the accompanying drawings, in which.

DETAILED DESCRIPTION OF THE PREFERRED EMBODIMENTS

Figure 1:
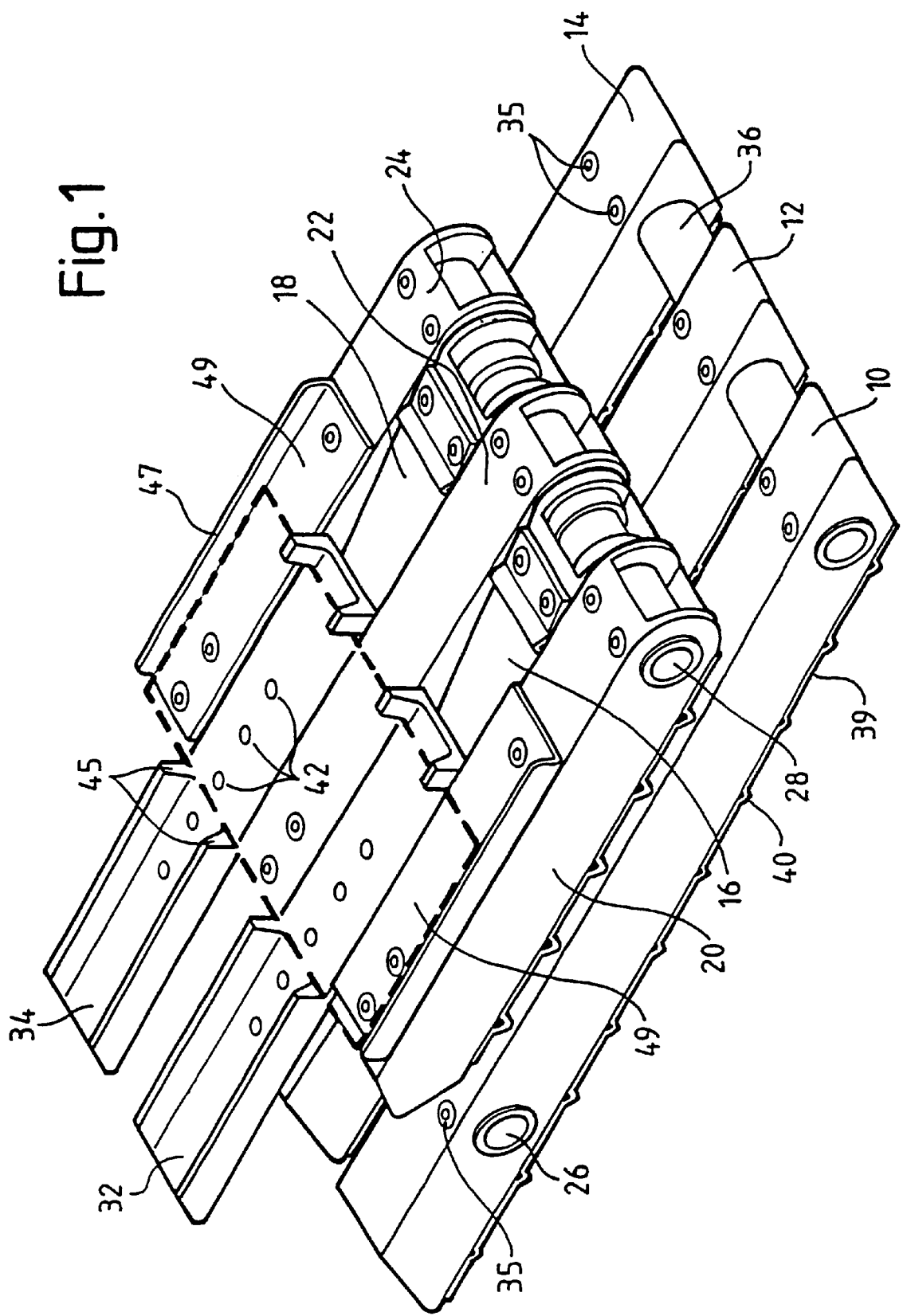
FIG. 1 shows a wheal chock device in accordance with the invention in its folded away configuration.

FIG. 1 shows a three-section chock device in a folded configuration. The first chock section is represented by bars 10,12 and 14; the second section is represented by bars 16 and 18 and the third section is represented by bars 20,22 and 24. The first section is hinged to the second section by a tube 26 which forms a hinge axis and the second section is hinged to the third section by a similar tube 28. A third tube 36 connects the free ends of the bars 10,12,14.

The bars shown are formed from square section stock. The bars can however alternatively be formed from channel section stock. Square section stock is preferred, because the device will usually be used in a dirty environment, and it is easier to clean and remove dirt from closed section bars than open section bars.

The bars 10,12,14,16,18,20,22 and 24 all carry external ribbed strips 39 on at least one face. These strips provided with ribs 40 are present to provide surface roughness to enhance the grip of a type on the bars and/or to enhance the grip of the device on the ground. Many different formations could be provided on the surfaces of the bars. Ribs may be formed by applying material to the surface of the bars as shown, or by deforming the bar surfaces as desired. In the embodiments shown, the strips 39 are riveted in place.

It is alternatively possible to pierce the bar walls and to locally raise the material of the wall to provide the surface roughness. This is particularly easy to do if the bars are formed from channel section but does have the disadvantage that dirt penetrates easily into the section and is then difficult to remove.

Figure 3:
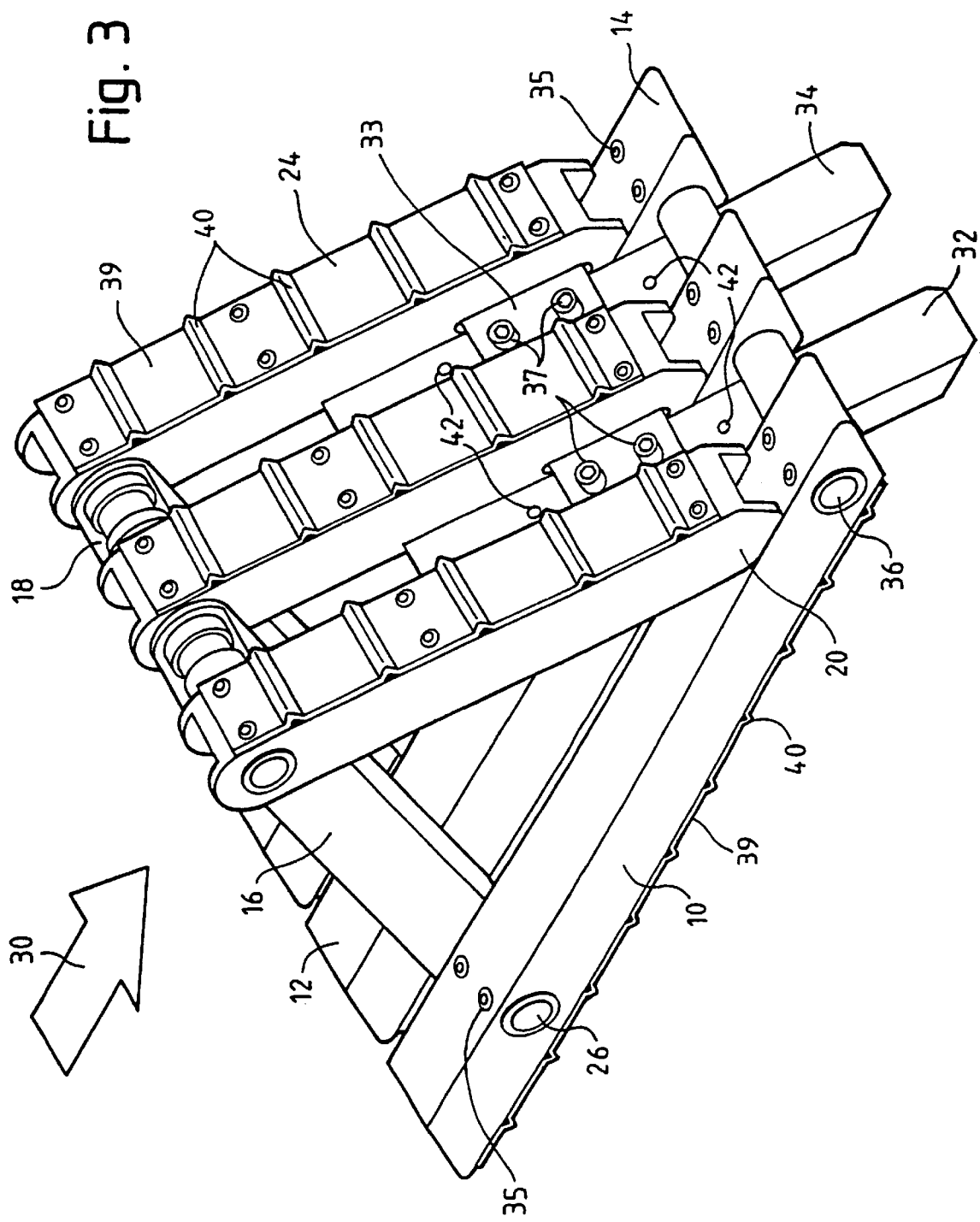
FIG. 3 shows the device of FIGS. 1 and 2 erected to act as a chock.

FIG. 3 shows the device erected as a wheel chock and with the three sections forming a generally equilateral triangle. In this position, the first chock section 10,12,14 will be placed on the ground; the second section 16,18 will be placed in front of (or behind) a wheel to be chocked with the load on this section being applied in the direction of an arrow 30 and the third section 20,22,24 supports the top end of the second section against the ground and/or against the first section.

In order for the third section 20,22,24 to do this, it has a pair of tongues 32,34 which project beyond the ends of the bars 20,22,24, lodge behind the parts of the third tube 36 which are exposed between the ends of the bars 20,22,24 (as shown in FIG. 3) and which are long enough to extend down below the bottom surface of the bars 10,12,14 so that they dig into the ground. As a result of this, when a force is applied to the second section as indicated by the arrow 30, the tongues will be pressed against the tube 36 and into the ground, and the bars 20,22,24 will be put into compression.

The extent to which the tongues 32,34 project beyond the ends of the bars 20,22,24 can be changed, depending on the nature of the ground on which the device is used. The tongues are secured to a cross member 33 (FIG. 3) by bolts 37 which screw into tapped holes in the tongues 32,34. The tongues are provided with a range of tapped holes, as can be seen at 42 and the bolts 37 can be screwed into a selected set of these holes to determine the extent of projection of the tongues.

The cross bar 33 extends the full width of the device and fits through correspondingly shaped slots in the side walls of the bars 20,22,24.

The tubes 26,28 and 36 can be held in place by rivets 35 extending through the adjacent walls of the bars, as shown in FIG. 3.

The tongues 32,34 can be of channel section material, to be strong enough to resist the wear and the bending loads to which they will be subjected.

Normally, the chock will be erected and positioned relative to a vehicle wheel with the ends of the tongues 32,34 sitting on the ground surface. As the weight of the vehicle is applied in the direction of arrow 30, a force will be applied through the bars 16,18 and the tube 28 to the bare 20,22,24 and to the tongues 32,34. This force will have a component acting on the tongues tending to dig them into the ground.

In an alternative construction which is not shown in the drawings, the bars could be of channel section, with the open faces of the bars facing inwards, so that the lower ends of the bars 20,22,24 could drop into the open-topped channels of the bars 10,12, and 14 so that they lodge behind the tube 36.

FIG. 1 shows how the reverse side of the third section 20,22,24 provides a support area for the foot of a lifting jack. A dotted line indicates the area of a typical jack foot which can be placed on the device in the position shown, where it is retained by lips 45,47. The lips 45 are formed by upstanding parts of the tongues 32,34 and the lips 47 are formed by riveted-on plates 49. With the device in this orientation, the larger area first section of the device is in contact with the ground, to enlarge the load bearing area when the jack is in use. This helps to prevent the jack base from sinking into the ground, when under load.

No lock or latch mechanism is required; the erect condition of the chock will automatically hold itself in position when a force is applied, whether or not the tongues 32,34 dig into the ground. It will be noted that the bars 10,12,14 extend in the direction from which the force 30 is being applied, beyond the position of the hinge tube 26. This allows a vehicle wheel to first apply a downward force on the device before acting against the bars 16,18 so that the device does not skid away in front of the vehicle wheel.

Figure 4:
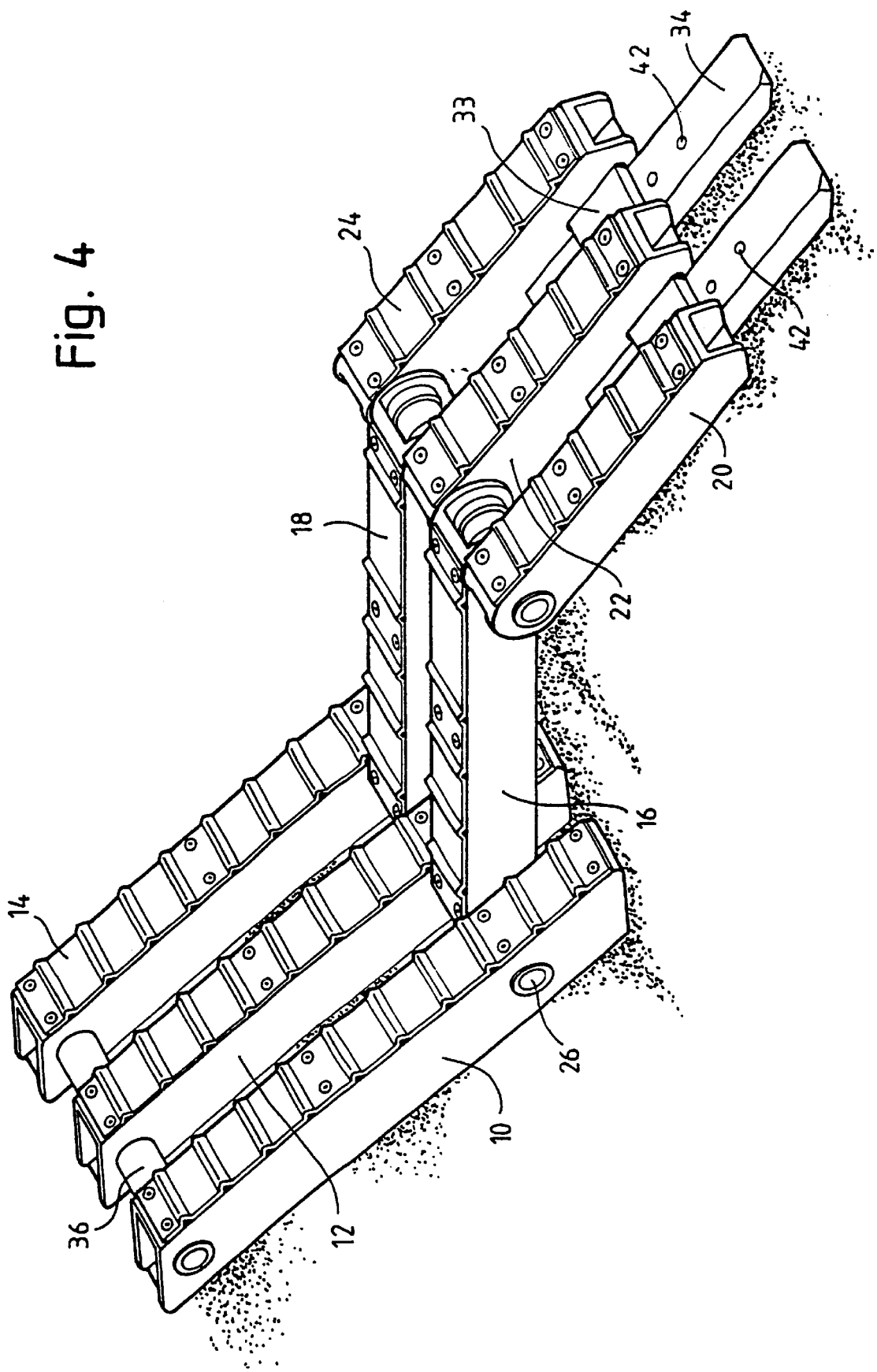
FIG. 4 shows the device unfolded and in use as a sand ladder lying on irregular ground.

FIG. 4 shows the device laid out along an uneven surface, with the hinges at 26 and 28 allowing the sections to follow the surface contours. In this configuration, the chock has its second application, to provide a firm surface for a vehicle wheel to obtain sufficient traction to drive out of a patch of loose ground.

Figure 2:
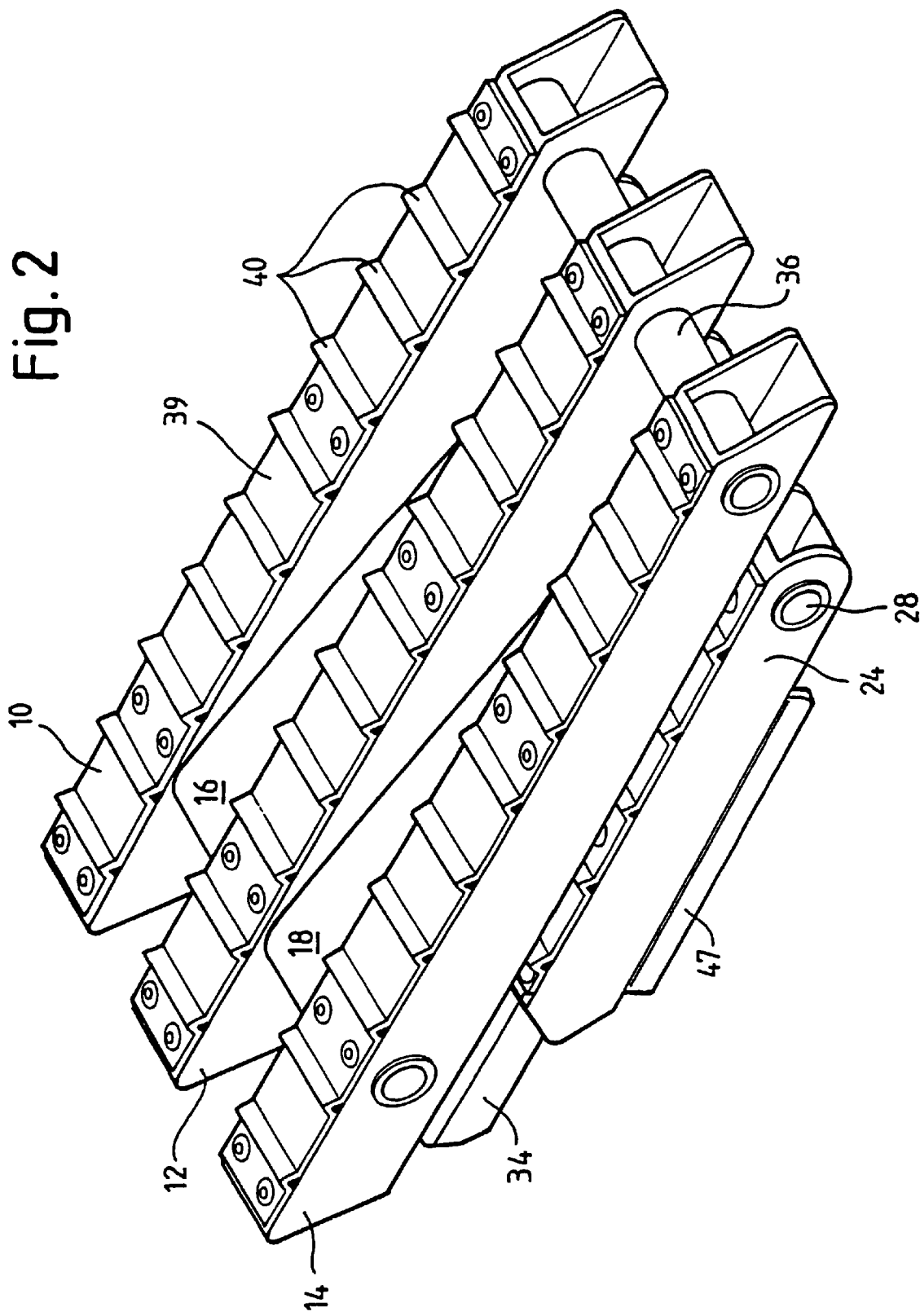
FIG. 2 shows the device of FIG. 1 in its folded configuration as shown in FIG. 1 but turned over.

In use, the device will be stored in a vehicle in its compact folded down condition as shown in FIGS. 1 and 2. When a wheel of the vehicle is to be chocked, the chock will be unfolded by lifting and turning anticlockwise the third section 20,22,24 about the hinge 28. In so doing the second section will also be turned (clockwise) about the hinge 26. The references to clockwise and anticlockwise are referred to the specific orientation of the chock as shown in FIG. 1, The tongues 32, 34 will be inserted between the bars 10,12,14 to retain the chock in a triangular configuration, and the chock can then be positioned against a wheel of the vehicle and used to prevent the vehicle moving. After use, the chock can be easily refolded to the configuration shown in FIG. 1

If the vehicle becomes stuck, for example in loose sand, or on snow or ice, the device can be used in another configuration. The sections will be laid out in line on the ground in front of a driven wheel of the vehicle, and once the wheel achieves frictional contact with the top surface of the first of the sections, it can be driven over the whole length of the device, with the friction between the device and the ground being sufficient to ensure that the device does not move relative to the ground while the vehicle moves relative to the device.

As the vehicle moves over the device, the sections will hinge relative to one another in accordance with the degree of support provided by the ground, and this will allow the device to follow the ground contours. It is a disadvantage of conventional rigid sand ladders that they tend to take up a bowed shape after use, because they cannot flex to follow the contours over which they are being used.

The invention thus provides a multi-purpose device for use with motor vehicles, particularly off-road vehicles, which in addition to its multi-purpose nature has advantages over both existing chocks and existing sand ladders as a result of its hinged sections.

By making the bars from hollow light weight material, such as aluminum or an alloy of aluminum or small section steel, the device can have a low overall weight what being able to fold up into a small space.

What is claimed is:

1. A wheel chock device for chocking the wheels of a vehicle, the device comprising:
   a first section comprising at least three parallel first bar members, each of the first bar members having opposite first and second ends;

a first pin connecting the first ends of the first bar members together in a manner such that the first bar members are spaced-apart and form a gap between each adjacent pair of the first bar members;

a second section comprising at least two parallel second bar members, each of the second bar members having opposite first and second ends, the first end of each of the second bar members being connected to the first pin in a manner such that the second bar members are spaced-apart with the first end of each of the second bar members positioned in one of the gaps between each adjacent pair of the first bar members in a one to one relation and in a manner such that the second bar members can pivot about the first pin relative to the first bar members;

a third section comprising at least three parallel third bar members, each of the third bar members having opposite first and second ends; and a second pin connecting the first ends of the third bar members together in a manner such that the third bar members are spaced-apart and form a gap between each adjacent pair of the first bar members, the second pin also being connected to the second bar members in a manner such that the second end of each of the second bar members is positioned in one of the gaps between each adjacent pair of the third bar members in a one to one relation and in a manner such that the second bar members can pivot about the second pin relative to the third bar members, the pivotal movement between the first and the second bar members and between the third and the second bar members allowing the first, second, and third sections to be selectively positioned in a collapsed position and an erected position relative to each other, the sections forming a generally triangular body with the second ends of the first bar members adjacent the second ends of the third bar members when the sections are in the erected position.

2. The wheel chock device of claim 1, wherein:

the first, second, and third bar members have a hollow square cross-section.

3. The wheel chock device of claim 1, wherein:

the first, second, and third bar members are straight members.

4. The wheel chock device of claim 1, wherein:

the first, second, and third sections are connected and configured to allow the sections to be positioned in a chain-like manner with the first, second, and third sections substantially coplanar.

5. The wheel chock device of claim 1, wherein:

the first, second, and third sections form a generally collapsed Z-shaped body when the sections are in the collapsed position, the first, second, and third sections also being connected and configured in a manner that allows the third bar members to engage and rest flat against the first bar members when the: sections are in the collapsed position.

6. The wheel chock device of claim 1, further comprising:

a third pin connecting the second ends of the first bar members together; and at least one tongue member non-movably fixed to the second ends of the third bar members, the tongued member having at least one distal end that is configured to slide into the gap between the first bar members as the sections are moved into the erected position and to engage against the third pin to hold the second ends of the third bar members adjacent the second ends of the first bag members when the sections are in the erected position.

7. The wheel chock device of claim 1, wherein:

the first, second, and third sections form a generally collapsed Z-shaped body when the sections are in the collapsed position, the first, second, and third sections also being connected and configured in a manner that allows the third bar members to engage and rest flat against the first bar members when the sections are in the collapsed position.

\* \* \* \* \*